Patented Feb. 24, 1953

2,629,682

UNITED STATES PATENT OFFICE 2,629,682

LIQUID METAL AMMINO SULFA COMPOUNDS

Sam Rosenzweig and Walter M. Fuchs, New York, N. Y.; said Fuchs assignor to said Rosenzweig No Drawing. Original application June 3, 1947, Serial No. 752,293. Divided and this application November 7, 1950, Serial No. 194,723

3 Claims. (Cl. 167—30)

This invention relates to new compounds, more particularly to complex compounds comprising a heavy metal, a sulfa compound and an amine or ammonia, and to methods for the preparation thereof. This application is a division of application Serial No. 752,293, filed June 3, 1947, now Patent No. 2,536,095.

Sulfa compounds, such as sulfanilamide and compounds obtained by replacing one of the hydrogen atoms on the amido nitrogen of sulfanilamide with an organic radical, have attained wide usage as bacteriostatic agents. These latter compounds have the general formula

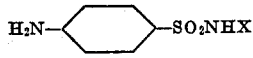

I wherein X represents a large variety of organic radicals of varying degrees of complexity. In the constant search for agents of improved utility and higher bactericidal activity, a wide variety of derivatives of the sulfa compounds have been prepared. It is known that one of the hydrogen atoms bonded to the amido nitrogen atom of sulfanilamide (usually referred to as the N' position) is acidic in character and can be replaced with a metal to form a metal salt. The second hydrogen atom is not replaceable by a metal under ordinary conditions. The single hydrogen atom bonded to the N' nitrogen atom in the compounds of Formula I can likewise be replaced with metals to form metal salts. In this manner, alkali metal salts, such as the sodium and potassium salts, as well as heavy metal salts, such as the iron, gold, copper and silver salts of a number of sulfa compounds have been prepared. The hydrogen atoms bonded to the amino nitrogen atom in the position para to the sulfoxy group (usually referred to as the N⁴ position) are apparently incapable of being replaced by metals under ordinary conditions, the —NH₂ group showing most of the characteristics of an aryl amine.

The N' metal salts of sulfa compounds just referred to are of interest in that they contain within the same molecule a sulfa compound and a heavy metal, both of which with few exceptions, have definite physiological effects. Many soluble salts of certain of the heavy metals, particularly of silver, copper, zinc, mercury and gold, are known to be definitely bactericidal or fungicidal, but they are frequently too toxic to be of value. The sulfa compounds alone, on the other hand, are generally considered to be bacteriostatic rather than bactericidal. It was thought that the combination of a heavy metal and a sulfa compound in the same molecule might prove beneficial. Unfortunately, however, the heavy metal salts of sulfa compounds are highly insoluble in water and have exhibited little or no practical utility due, in part, to the lack of methods suitable for application of the substances.

It has now been found that compounds formed by replacing an N', or amido, hydrogen atom in a sulfa compound with a heavy metal and having the formula

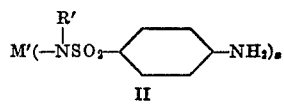

II wherein M' represents a heavy metal, $x$ represents the valence of the heavy metal and R' represents hydrogen or an organic radical, may be reacted with amines or ammonia to form new complex compounds having the formula

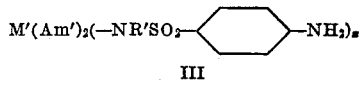

III wherein M' and R' have the values given, Am' represents ammonia or an amine and $x$ is an integer equal to the valence of the heavy metal. These compounds are herein referred to as metal di-ammino sulfa compounds.

A preferred embodiment of the invention contemplates new compounds having the formula

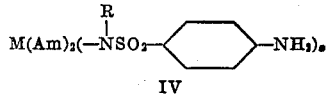

IV wherein M is a heavy metal from the group silver, mercury, zinc, palladium, nickel and copper, Am is a basic nitrogen compound from the group ammonia, primary amines containing the group —CH₂NH—CH₂— and heterocyclic amines containing a hetero amino nitrogen atom, R is from the group hydrogen and heterocyclic radicals containing a hetero nitrogen atom and $x$ is an integer equal to the valence of the heavy metal.

Most of the new complex compounds are crystalline solids from which the ammonia or amine is expelled by heating to leave the metal salt of the sulfa compound having the formula

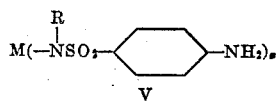

V

Some of the compounds tend to occur as somewhat tacky solids.

The compounds are decomposed very slowly by water with the formation of the free amine and the metal salt of the sulfa compound. They are decomposed somewhat more rapidly by very dilute aqueous mineral acids with the formation of the metal salt of the sulfa compound and a mineral acid salt of the amine or ammonia. In the presence of sufficient strong mineral acid, the decomposition proceeds further with the formation of the free sulfa compound and the mineral acid salt of the metal. The new complex compounds are generally insoluble in water and in most organic liquids. They are, however, soluble in many liquid amines and mixtures thereof, and in aqueous solution of amines or of ammonia and are stable over long periods of time in such solutions. Aqueous solutions of hydroxyalkyl amines, such as aminoethanol, aminopropanol, aminobutanol and diethanol amine, particularly the monohydroxyalkyl amines, are well suited as solvents for the new compounds. The complex compounds have a faint odor of amine or ammonia but are stable over long periods of time at ordinary temperatures, particularly when in closed containers protected from excessive atmospheric moisture.

The complex compounds described here for the first time find utility in the field of bactericides, fungicides, germicides and antiseptics. They may be incorporated in high concentrations in the solvents mentioned to provide solutions of high bactericidal value.

In certain uses of the compounds, advantage is taken of their property of reverting to the metal salt of the sulfa compound when heated. Thus, fibrous articles, such as canvas, sponges and the like, and even only slightly porous articles such as bristles, are soaked thoroughly in a solution of one or a mixture of the complex compounds and then dried and heated. The amine or ammonia is thus volatilized leaving the highly insoluble metal salt of the sulfa compound evenly distributed throughout the interstices of the article in a form difficult to remove by washing. Substantially the same result is accomplished by treating the soaked article with a dilute aqueous solution of a mineral acid in amount sufficient to combine with the amine or ammonia, but insufficient to decompose the metal salt of the sulfa compound. Articles so treated are highly self-sterilizing.

Amines which can be used in preparing compounds of the invention include monomethyl-amine, monoethyl amine, mono-n-propyl amine, mono-iso-propyl amine, ethylene diamine, benzyl amine, monoethanol amine, morpholine, diethanol amine, ephedrine (methyl-(a-methyl-b-hydroxy-b-phenyl-ethyl)amine), neosynephrine (methyl -(b-3-hydroxyphenyl-b-hydroxy-ethyl)-amine), pyridine and quinoline. Heterocyclic radicals containing a hetero nitrogen atom, represented by R in the Formula IV, include the pyridyl, thiazolyl, diazyl, methyldiazyl and dimethyldiazyl radicals occurring in sulfapyridine, sulfathiazole, sulfadiazine, sulfamerazine, and sulfamethazine, respectively, as well as many others.

The metal salts of sulfa compounds used as intermediates in preparing the complex compounds of the invention can be prepared readily by dissolving the sulfa compound in an equivalent amount of an aqueous alkali, such as sodium hydroxide, and mixing the solution with about an equivalent amount of an aqueous solution of a water-soluble salt of the metal. The metal salts of the sulfa compounds are formed as insoluble precipitates, some of which are colored, depending upon the metal involved. They can be recovered readily in good yield and in a state of high purity by filtering the mixture and washing the salt with water. The reaction is preferably carried out at a pH of about 5, although the compounds may be formed at a pH somewhat higher or lower than this but often with considerable sacrifice in yield. Representative examples are given hereinafter illustrating the preparation of a number of these intermediate metal salts of sulfa compounds.

The complex compounds of the invention may be prepared in a number of ways, one convenient way being by dissolving the metal salt of the sulfa compound in an appropriate anhydrous liquid amine. Upon evaporation of the excess amine, the complex compound remains. Alternatively, the solution of the metal salt of the sulfa compound in the amine may be diluted by the gradual addition of a liquid inert under the reaction conditions and miscible with the amine, such as toluene, xylene, carbon tetrachloride, chloroform, and the like. The complex compound is precipitated by this procedure and after recovery by filtering is washed thoroughly with additional portions of the inert liquid and then dried. In this way, the complex compounds are obtained in high yield and in a state of high purity. Complex compounds containing ammonia rather than an amine may be prepared in a similar manner using liquid ammonia and allowing the excess to evaporate.

In some instances, complete solution of the metal salt of the sulfa compound in the amount of amine used may not be obtained, the complex compound beginning to separate as crystals before all the metal salt of the sulfa compound has dissolved. In other instances, i. e., when neither the salt of the sulfa compound or the complex compound are appreciably soluble in the particular amine employed, the progress of the reaction is apparent only by a change in the appearance of the solid phase. The procedure described is, however, applicable in such cases.

Metal di-ammino sulfa compounds contemplated by the invention include, among many others, the following:

Silver di-ammono sulfanilamide
Silver di-ammono sulfadiazine
Silver di-ammono sulfathiazole
Silver di-ammono sulfapyridine
Silver di-morpholinammino sulfapyridine
Silver di-methylammino sulfadiazine
Silver di-morpholinammino sulfanilamide
Silver di-ethylammino sulfadiazine
Silver di-morpholinammino sulfadiazine
Silver di-morpholinammino sulfathiazole
Silver di-ethylenediammino sulfadiazine
Silver di-benzylammino sulfadiazine
Silver di-methyl-(b - 3 - hydroxyphenyl - b - hydroxy-ethyl)ammino sulfadiazine
Silver di-monoethanolammino sulfathiazole
Cupric di-ethylammino sulfadiazine
Cupric di-butylammino sulfapyridine
Cupric di-n-propylammino sulfanilamide
Cupric di-ethylenediammino sulfapyridine
Cupric di-morpholinammino sulfathiazole
Cupric di-ethanolammino sulfathiazole
Cupric di-diethanolammino sulfadiazine
Cupric di-benzylammino sulfathiazole
Mercuric di-ethylammino sulfapyridine
Mercuric di-butylammino sulfamerazine Mercuric di-morpholinammino sulfanilamide
Mercuric di-pyridinammino sulfapyridine
Mercuric di-methyl-(a-methyl-b-hydroxy-b-phenyl-ethyl) ammino sulfadiazine
Zinc di-pyridinammino sulfanilamide
Zinc di-quinolinammino sulfamethazine
Zinc di-ethylenediammino sulfadiazine
Zinc di-methyl-(b-3-hydroxyphenyl-b-hydroxy-ethyl) ammino sulfathiazole
Zinc di-morpholinammino sulfathiazole
Palladium di-isopropylammino sulfamerazine
Palladium di-morpholinammino sulfathiazole
Palladium di-ethylammino sulfamerazine
Palladium di-diethanolammino sulfadiazine
Nickel di-morpholinammino sulfathiazole
Nickel di-benzylammino sulfanilamide
Nickel di-methyl-(b-3-hydroxyphenyl-b-hydroxy-ethyl) ammino sulfapyridine
Nickel di-pyridinammino sulfadiazine
Nickel di-methyl-(a-methyl-b-hydroxy-b-phenyl-ethyl) ammino sulfathiazole The complex compounds can be analyzed by a titration method substantially as follows: A sample of the product of convenient size is stirred with 100 milliliters of water, warmed gently and titrated with standard hydrochloric acid solution. The end point may be determined using an indicator, such as methyl orange, or electrometrically. The latter is advisable in the case of compounds of certain metals, e. g., copper, mercury and palladium, which tend to form colored mixtures which obscure the color change of an indicator. The use of a slight excess of acid followed by back-titration with standard alkali hastens the process. The acid consumed is that necessary to form the hydrochloride of the amine present in the compound. The mixture is then acidulated strongly with concentrated hydrochloric acid which decomposes the metal salt of the sulfa compound, and the metal in the solution is then determined in any convenient way. In the case of silver compounds, acidulation with an excess of hydrochloric acid precipitates silver as the chloride which can be recovered by filtering, washing thoroughly with acetone to remove sulfa compound and then drying and weighing.

Certain advantages of the invention are apparent from the following examples which are given by way of illustration only and are not to be construed as limiting.

EXAMPLE 1

A number of metal salts of sulfa compound were prepared as follows:

One equivalent weight of an appropriate sulfa compound was stirred with an aqueous solution containing one equivalent weight of sodium hydroxide until dissolved. This solution was then added slowly with stirring to an aqueous solution containing about one equivalent weight of an appropriate metal salt. Metal salts used in the several preparations included: $CuSO_4.5H_2O$, $Hg(NO_3)_2.H_2O$, $Ni(NO_3)_2.H_2O$, $PdCl_2$, $ZnCl_2$ and $AgNO_3$. The pH of the solution was in each case adjusted to about 5 with nitric acid. The metal salt of the sulfa compound formed as a precipitate in each case and was recovered by filtering, washing with water and drying. Each of the dried salts was analyzed for metal content without further purification. In the accompanying Table I there are given for each determination the sulfa compound used, the metal salt used, the formula, yield and color of the compound formed, and the theoretical and actual per cent of metal in the compound.

Table I

| Sulfa Compound Used | Metal Salt Used | Empirical Formula of Compound Formed | Yield based on Amount of Sulfa Compound Used | Color | Percent Metal | |
|---|---|---|---|---|---|---|
| | | | | | Theory | Found |
| Sulfathiazole | $CuSO_4.5H_2O$ | $(C_9H_8N_3O_2S_2)_2Cu$ | 100 | bordeaux red | 11.1 | 10.6 |
| Do | $Hg(NO_3)_2.H_2O$ | $(C_9H_8N_3O_2S_2)_2Hg$ | 100 | white | 28.3 | 27.8 |
| Do | $Ni(NO_3)_2.H_2O$ | $(C_9H_8N_3O_2S_2)_2Ni$ | 91 | light green | 10.3 | 10.2 |
| Do | $PdCl_2$ | $(C_9H_8N_3O_2S_2)_2Pd$ | 83 | orange brown | 17.3 | 17.0 |
| Do | $ZnCl_2$ | $(C_9H_8N_3O_2S_2)_2Zn$ | 100 | white | 11.4 | 11.2 |
| Do | $AgNO_3$ | $C_9H_8N_3O_2S_2Ag$ | 100 | do | 29.8 | 30.2 |
| Sulfanilamide | $AgNO_3$ | $C_6H_7N_2O_2SAg$ | 100 | brown | 38.5 | 39.1 |
| Sulfadiazine | $AgNO_3$ | $C_{10}H_9N_4O_2SAg$ | 100 | white | 30.0 | 29.7 |
| Sulfapyridine | $AgNO_3$ | $C_{11}H_{10}N_3O_2SAg$ | 100 | brown | 30.1 | 29.8 |

EXAMPLE 2

One gram of silver sulfadiazine was placed in a Dewar flask and nine grams of liquid ammonia added. The silver salt dissolved gradually, forming a light yellow solution. After standing for several hours, about one-half of the ammonia had evaporated and crystals had begun to separate. After all the ammonia had evaporated, there remained 1.2 grams of silver di-ammono sulfadiazine as a slightly yellowish crystalline product which smelled faintly of ammonia.

Anal.:
Calc'd for $Ag(NH_3)_2(C_{10}H_9N_4O_2S)$: Ag, 27.6; $NH_3$, 8.7.
Found: Ag, 27.2; $NH_3$, 9.5.

EXAMPLE 3

Two grams of silver sulfadiazine were mixed with five grams of methyl-(b-3-hydroxyphenyl-b-hydroxy-ethyl)-amine and 20 milliliters of glacial acetic acid was added. The mixture was kept at room temperature for two hours with frequent stirring. The solid phase at first became somewhat soft but gradually changed to a fine powder. The mixture was filtered through a fritted glass filter and the solid product washed several times with small portions of glacial acetic acid and then with chloroform. The product after drying in vacuo over alkali consisted of 2.5 grams of silver di-methyl-(b-3-hydroxy-phenyl-b-hydroxy-ethyl) ammino sulfadiazine.

The compound is insoluble in water but easily soluble in monoethanol amine, the solution remaining clear upon dilution with water.

Anal.:
Calc'd for $C_{28}H_{33}O_6N_6SAg$: Ag, 15.6; $C_8H_8O_2NHCH_3$, 48.0.
Found: Ag, 15.9; $C_8H_8O_2NHCH_3$, 48.0.

EXAMPLE 4

Two grams of silver sulfathiazole and 10 grams of monoethanol amine were stirred together until all of the solid material had dissolved. Silver di-monoethanolammino sulfathiazole was precipitated from the mixture by the addition of an excess of chloroform, the mixture filtered and the solid washed thoroughly with chloroform and dried. The dry product was a white somewhat waxy solid soluble in aqueous ethanolamine, but insoluble in water.

Anal.:
Calc'd for $C_{13}H_{22}O_4N_5S_2Ag$: Ag, 22.3.
Found: Ag, 22.0.

EXAMPLE 5

Two grams of silver sulfadiazine was dissolved in 10 grams of ethylamine. A yellow solution was formed. The ethylamine was allowed to evaporate and there remained 2.6 grams of a yellow solid which upon drying in vacuo became white.

Anal.:
Calc'd for $C_{14}H_{23}N_6O_2SAg$: Ag, 24.1; $C_2H_5NH_2$, 20.1.
Found: Ag, 23.7; $C_2H_5NH_2$, 23.5.

EXAMPLE 6

A number of metal di-ammino sulfa compounds were prepared substantially as by the methods of Examples 2 to 5 and analyzed for metal and amine. The compounds prepared, the empirical formula of each and the theoretical and determined percentages of metal and of amine in each are given in the accompanying Table II. The compounds prepared in Examples 2 to 5, inclusive, are included by way of comparison.

wherein R'' represents the thiazolyl-2 radical. This basic gold salt of sulfathiazole can then be reacted with an amine to form a compound which still contains an hydroxyl group and which also contains three molecules of amine. This latter compound has an analysis corresponding to the formula

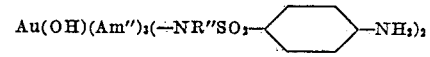

wherein Am'' represents a molecule of an amine and R'' has the value given.

EXAMPLE 7

A solution was prepared by dissolving two grams of chloroauric acid $AuCl_3.HCl.4H_2O$, in 20 milliliters of water and this solution was stirred slowly into a solution of 3.9 grams of sulfathiazole in 41 milliliters of N/2 sodium hydroxide. The brown, amorphous precipitate which formed was filtered on a fritted glass filter and washed with water until the washings gave a negative reaction for halogen. The product, after drying at 100° C. and then in vacuo, weighed 3.8 grams. Analysis of the product without further purification indicated it to be a basic gold salt of sulfathiazole.

Anal.
Calc'd for $C_{18}H_{17}N_6O_5S_4Au$: Au, 27.2.
Found: Au, 26.8.

*Table II*

| Compound | Empirical Formula | Color | Percent Metal | | Percent Amine | |
|---|---|---|---|---|---|---|
| | | | Theor. | Found | Theor. | Found |
| 1 Silver dimorpholinammino sulfanilamide. | $C_{14}H_{25}N_4O_4SAg$ | white | 23.8 | 22.9 | 38.4 | 39.9 |
| 2 Silver di-morpholinammino sulfadiazine. | $C_{16}H_{27}N_5O_4SAg$ | do | 20.3 | 20.5 | 32.7 | 32.0 |
| 3 Silver de-morpholinammino sulfapyridine. | $C_{19}H_{28}N_5O_4SAg$ | do | 20.4 | 20.6 | 32.8 | 32.0 |
| 4 Silver di-morpholinammino sulfathiazole. | $C_{17}H_{26}N_5O_4S_2Ag$ | do | 20.1 | 20.3 | 32.5 | 31.7 |
| 5 Copper di-morpholinammino sulfathiazole. | $C_{26}H_{34}N_8O_6S_4Cu$ | red | 8.5 | 8.2 | 23.3 | 22.8 |
| 6 Nickel di-morpholinammino sulfathiazole. | $C_{26}H_{34}N_8O_6S_4Ni$ | light green | 7.9 | 7.7 | 23.4 | 23.0 |
| 7 Palladium di-morpholinammino sulfathiazole. | $C_{26}H_{34}H_8O_6S_4Pd$ | orange brown | 13.5 | 14.0 | 21.1 | |
| 8 Zinc di-morpholinammino sulfathiazole. | $C_{26}H_{34}H_8O_6S_4Zn$ | white | 8.7 | 8.7 | 23.2 | 23.6 |
| 9 Silver di-ammono sulfadiazine. | $C_{10}H_{15}N_6O_2SAg$ | do | 27.6 | 27.2 | 8.7 | 9.5 |
| 10 Silver di-ethylammino sulfadiazine. | $C_{14}H_{23}N_6O_2SAg$ | do | 24.1 | 23.7 | 20.1 | 23.5 |
| 11 Silver di-ethylenediammino sulfadiazine. | $C_{14}H_{25}N_8O_2SAg$ | do | 22.6 | 22.2 | 25.2 | 25.5 |
| 12 Silver di-benzylammino sulfadiazine. | $C_{24}H_{27}N_6O_2SAg$ | do | 18.8 | 18.4 | 37.5 | 38.1 |
| 13 Silver di-methyl-(b-3-hydroxyphenyl-b-hydroxyethyl) ammino sulfadiazine. | $C_{28}H_{37}N_6O_8SAg$ | do | 15.6 | 15.9 | 48.0 | 48.0 |
| 14 Silver di-mono-ethanolammino sulfathiazole. | $C_{13}H_{22}N_5O_4S_2Ag$ | do | 22.3 | 22.0 | 25.2 | |

Although the present invention is particularly concerned with compounds having the Formula IV given previously, it also contemplates other complex compounds closely allied thereto, but comprising a number of molecules of amine in each molecule of the complex compound different from two. The invention also contemplates certain complex compounds which may be described as basic in character in that they apparently contain an hydroxyl radical in the molecule. Thus auric chloride can be reacted with sulfathiazole in the form of its alkali metal salt to produce a compound having an analysis corresponding to the formula

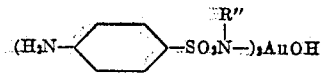

EXAMPLE 8

Two grams of the basic gold salt of sulfathiazole, prepared as in Example 7, was dissolved in 20 grams of morpholine. The dark-colored, clear solution which formed was poured with stirring into 200 milliliters of benzene. A precipitate formed which was at first somewhat tacky but which hardened slowly upon standing. The precipitate was washed with benzene by decantation and finally filtered and dried. The dried product weighed 2.4 grams. Analysis without further purification indicated the product to be a complex compound comprising a basic gold salt of sulfathiazole and three molecules of morpholine.

Anal.

Calc'd for $C_{30}H_{44}N_9O_8S_4Au$: Au, 20.0; morpholine, 26.5.

Found: Au, 19.5; morpholine, 26.8.

We claim:

1. A liquid product comprising an amine and a compound having the formula

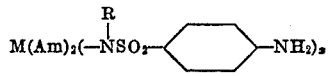

wherein M is a heavy metal from the group silver, mercury, zinc, palladium, nickel and copper, Am is a basic organic nitrogen compound from the group consisting of ammonia, primary alkyl amines, primary hydroxyalkyl amines, primary aminoalkyl amines, primary aralkyl amines, secondary hydroxyaralkyl alkyl amines and monocyclic heterocyclic basic nitrogen compounds devoid of hetero atoms other than nitrogen and oxygen, R is from the group hydrogen and heterocyclic radicals containing a hetero nitrogen atom and $x$ is an integer equal to the valence of the heavy metal the amine being from the same group as the basic organic nitrogen compound.

2. A liquid product as claimed in claim 1 wherein the amine is a monoalkanol amine.

3. A liquid product as claimed in claim 1 wherein the amine is monoethanol amine.

SAM ROSENZWEIG.
WALTER M. FUCHS.

REFERENCES CITED

The following references are of record in the file of this patent:

UNITED STATES PATENTS

| Number | Name | Date |
|---|---|---|
| 2,361,624 | Hamilton | Oct. 31, 1944 |
| 2,429,404 | Dixon | Oct. 21, 1947 |
| 2,442,602 | Hubner | June 1, 1948 |